US012406058B2

(12) United States Patent
Madan et al.

(10) Patent No.: US 12,406,058 B2
(45) Date of Patent: Sep. 2, 2025

(54) PROTECTING DATA AGAINST MALWARE ATTACKS USING CYBER VAULT AND AUTOMATED AIRGAP CONTROL

(71) Applicant: Dell Products L.P., Round Rock, TX (US)

(72) Inventors: Nitin Madan, Cupertino, CA (US); Salil Dangi, Mission Viejo, CA (US); Bhimsen Bhanjois, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 18/163,066

(22) Filed: Feb. 1, 2023

(65) Prior Publication Data

US 2024/0256658 A1   Aug. 1, 2024

(51) Int. Cl.
    *G06F 21/55*   (2013.01)
    *G06F 21/56*   (2013.01)

(52) U.S. Cl.
    CPC .......... *G06F 21/554* (2013.01); *G06F 21/566* (2013.01); *G06F 2221/034* (2013.01)

(58) Field of Classification Search
    CPC . G06F 21/554; G06F 21/566; G06F 2221/034
    USPC ........................................................ 726/23
    See application file for complete search history.

(56) References Cited

U.S. PATENT DOCUMENTS

| 8,655,939 B2* | 2/2014 | Redlich ................. G06Q 10/06 709/212 |
| 8,984,275 B2* | 3/2015 | Ozgit .................. H04L 63/1425 713/154 |
| 11,943,251 B2* | 3/2024 | Shua ..................... G06F 11/301 |
| 2010/0250497 A1* | 9/2010 | Redlich ................. G06Q 10/06 707/661 |
| 2019/0340552 A1* | 11/2019 | Demetriou ............. G06F 18/22 |
| 2022/0345480 A1* | 10/2022 | Shua ..................... G06F 21/577 |
| 2022/0345481 A1* | 10/2022 | Shua ..................... H04L 67/101 |

* cited by examiner

*Primary Examiner* — Samson B Lemma
(74) *Attorney, Agent, or Firm* — Staniford Tomita LLP

(57) ABSTRACT

Improving data recovery and restoration times by clamping down security after malware detection, and protect a data center from a cyber recovery vault. Embodiments provide a cyber recovery vault configured to store data backed up for a production site for long-term retention and disaster recovery. The vault is coupled to the data center comprising a production site through an automated air gap controlled by the vault. Control signals transmitted by the vault trigger the air gap to close the coupling between the vault and data center upon detection of a malware attack, and the data center is configured to listen for the control signals and implement heightened security measures to protect its data in response to the control signal.

8 Claims, 12 Drawing Sheets

400

| HEIGHTENED SECURITY LEVEL | ACTIONS |
|---|---|
| HSL0 | Protection Storage Locked Down to All External Traffic |
| HSL1 | Conditionally Fail Delete Operations and Disable Garbage Collection |
| HSL2 | Protect Clean Copies Using Retention Locks |
| HSL3 | Store Client Info in Extended Metadata Mark Tainted Traffic |

420

| HEIGHTENED SECURITY LEVEL | APPLICATION |
|---|---|
| HSL0 | High Confidence Alert of Dangerous Attack |
| HSL1 | High Confidence Alert of Possible Attack |
| HSL2 | Low Confidence Alert of Possible Attack |
| HSL3 | Suspicion of Possible Attack |

PROTECTING DATA AGAINST MALWARE ATTACKS USING CYBER VAULT AND AUTOMATED AIRGAP CONTROL

TECHNICAL FIELD

This invention relates generally to data protection, and more specifically to preventing ransomware attacks on protection storage using delete restrictions.

BACKGROUND

Data protection involves the routine backup of data from primary memory storage to trusted secondary or backup storage devices. Whether in local memory or long-term storage, data is generally vulnerable to attack from various actors. Various different types of data or cybersecurity attacks can be used to target computer systems, including denial-of-service (DoS) attacks, man-in-the-middle (MITM) attacks, phishing attacks, password attacks, and so on.

Ransomware attacks are another common type of attack, and are an important concern for nearly all organizations. Ransomware is a type of malware in which the attacker threatens to publish, destroy, or permanently block access to the victim's data unless a ransom is paid. While simple ransomware may lock the user's system, more advanced malware uses a cryptoviral extortion technique. Ransomware attack vectors can come from multiple directions and target not only primary storage, but also secondary/backup storage. Ransomware and similar malware attacks can be very destructive and costly, as well as very expensive to remedy after the fact. Present remedial measures only apply after an attack has occurred, and thus do not protect against impending attacks before they occur.

Some data protection systems backup production storage into production protection storage, which is then replicated to the DR protection storage. Some of this data may also flows into a cyber recovery vault from the production protection storage. If a data analysis routine finds a corruption, the recovery from the cyber recovery vault is complex and could mean several hops before the data lands in production storage. The recovery methods depend on the backup software and may require using a clean room from within the vault. In its simplest form, the backup is reverse replicated to the production protection storage in a clean namespace, and then copied into the production storage. In more complex strategies, figuring out the backup file corresponding to the storage appliance requires the backup software metadata. In this case, a clean room is setup wherein the copy is recovered, and this copy is then moved to the production storage followed by an immediate backup on the production protection storage. The recovery from the cyber recovery vault can thus be very complex and time consuming. In case of a cyber-attack, the business is essentially down, so the efficiency of recovery is of paramount importance in ensuring smooth data continuity and business operations.

What is needed, therefore, is a method of proactively instituting security measures to protect data immediately after a confirmed high probability hint of a ransomware attack is received.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
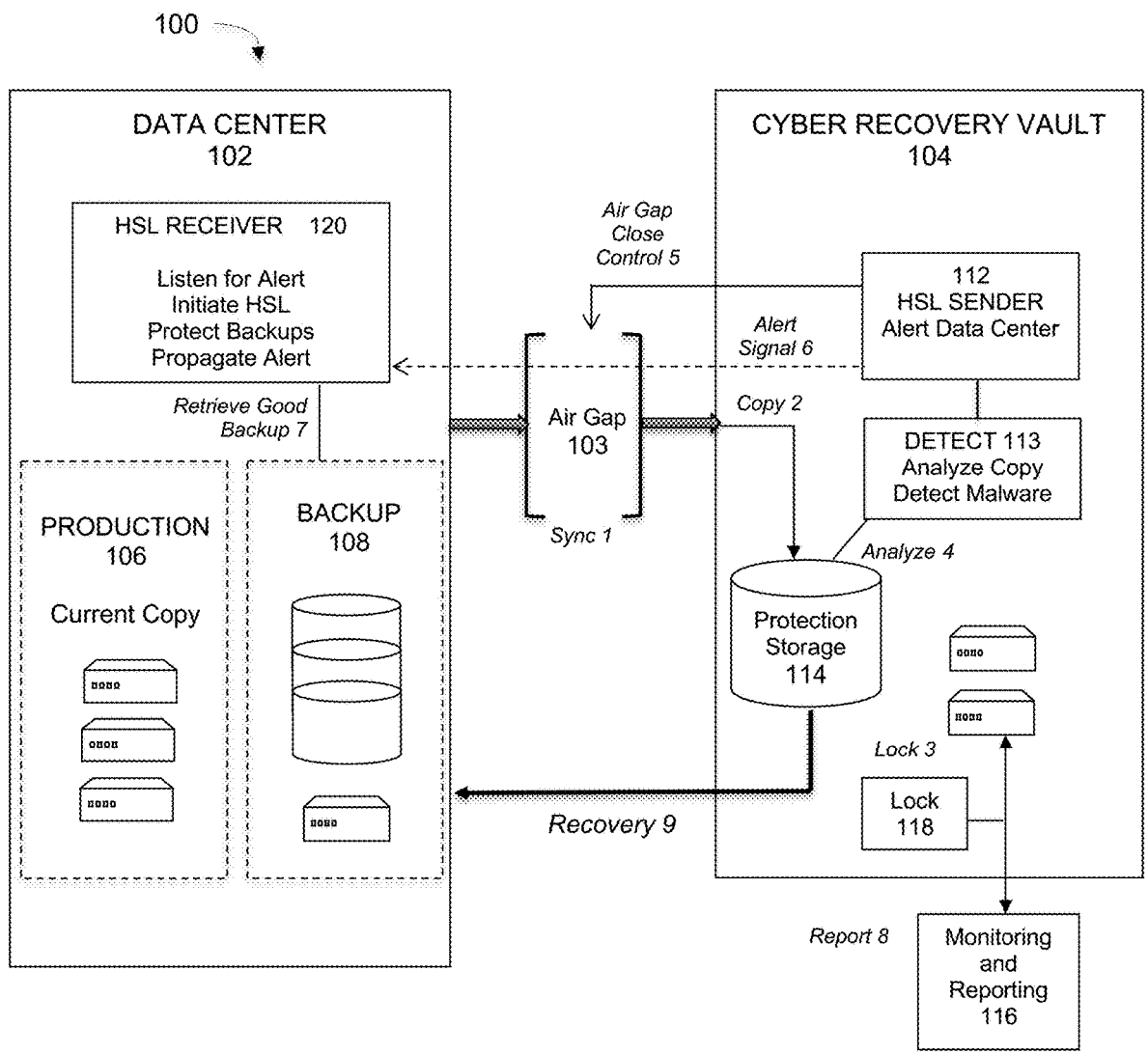
FIG. 1 is a diagram of a network implementing a malware detection and backup copy protection, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments can be used in a data protection system that manages the backup of data from one or more data sources to storage devices, such as network storage, client storage, and/or virtual storage devices. The virtual storage may comprise any number of virtual machines (VMs) or groups of VMs may be provided to serve as backup targets. A backup server implements certain backup policies that set relevant backup parameters such as backup schedule, storage targets, data restore procedures, and so on. Such a system may be a Data Domain Restorer (DDR)-based deduplication storage system, and the storage server may be implemented as a DDR Deduplication Storage server provided by EMC Corporation. However, other similar backup and storage systems are also possible.

The network coupling the system may be a public cloud network (but may also be a private cloud, LAN, WAN or other similar network), and may be implemented using protocols such as Transmission Control Protocol (TCP) and/or Internet Protocol (IP), well known in the relevant arts. In a cloud computing environment, a centralized cloud computing platform provides the network in which applications, servers and data are maintained. In a data protection system, the backup software may be any suitable backup program such as EMC Data Domain, Avamar, and so on.

Many large-scale enterprise environments differentiate between production storage/data and protection storage/data. Typically, a production site contains servers that generate and process data, and the protection (or backup) site contains storage media and backup servers that store the data through backup and DR (disaster recovery) processes.

Embodiments include a system and method that after detects the presence or threat of ransomware in the system and prevents destructive operations on the production protection storage and DR protection storage, and therefore production storage. The automated process prevents an attacker to do further damage like destroy the backup(s), delete the namespace, or destroy the filesystem. Embodiments include an automated way of signaling and clamping down security at the production protection storage and client devices corresponding to the backup which was corrupted. This method is essential to enable data recovery from the production protection storage, or the DR protection storage, which is typically much faster than recovery from a cyber recovery vault, or similar data store.

Embodiments use a replication channel to communicate and control the production storage (e.g., Data Domain storage) from the recovery vault. They also introduce heightened security protocols against malware attacks, as well as hidden snapshots and system retention locks, and they create an allow-list and deny-list for files and clients.

FIG. 1 is a diagram of a network implementing a malware detection and backup copy protection, under some embodiments. As shown in FIG. 1, system 100 contains a data center 102 having a production site 106 and a backup site 108. The production site 106 contains servers that generate and process data, and the backup site 108 contains storage media and backup servers that store the data through backup and disaster recovery (DR) processes. A current version (e.g., Version_A) of a dataset to be backed up is generated and maintained in the production site 106. Upon initiation of a backup process, the current version is backed up to backup site 108 where it is stored as a current copy (e.g., Version_A_backup), as subsequent production datasets are backed up (per a regular backup schedule), the backup site 108 stores successive copies (e.g., Version_A_backup, Version_B_backup, Version_C_backup, etc.) as long as storage space remains.

The embodiment of FIG. 1 illustrates the cyber recovery vault 104, such as the DellEMC PowerProtect Cyber Recovery vault provides a data storage site as an isolated storage medium that provides multiple layers of protection to provide resilience against cyberattacks, including malware (e.g., ransomware) attacks. It moves critical data away from the attack surface, physically isolating it within a protected part of the data center and requires separate security credentials and multi-factor authentication for access. Additional safeguards include an automated operational air gap 103 to provide network isolation and eliminate management interfaces which could be compromised. PowerProtect recovery tools automate the synchronization of data between production systems 106/108 and the vault 104 creating immutable copies with locked retention policies, using lock 118. If a cyberattack occurs users can quickly identify a clean copy of data (from the backup site 108) and recover critical systems to resume normal operations. When a production environment is ready for recovery, certain management tools automate the creation of the restore points that are used for recovery or security analytics, as well as performing damage assessments and forensics to provide an organization with the confident and most reliable path to recovery of business-critical systems.

For the embodiment of FIG. 1, the cyber recovery vault 104 includes protection storage 114, which is used to store backup copies generated by the backup site 108 in data center 102. The vault is coupled to the data center through an air gap 103 so that the vault and protection storage are isolated from the data center and other system elements. In an embodiment, this air gap 103 is controlled from the vault 104 so that it can be opened and closed under vault control for transmission of certain control signals and for isolation control.

For the embodiment of FIG. 1, the vault 104 includes a detection component 113 that analyzes the copies sent to the protection storage 114 for the presence of any malware. If the detector 113 detects any malware in the data of an analyzed backup copy, it sends a signal to HSL sender 112 to close the air gap 103 and transmit an alert message to the data center. During analysis, the detector 113 analyzes the entire data of the analyzed dataset, as opposed to just the metadata of the dataset to ensure that any presence of malware in the code will be detected.

The data center 102 includes an HSL receiver 120 that is always on and listening for alerts sent from the vault 104. The receiver function 120 may also be implemented as part of the backup 108 (production protection storage). If an alert signal is sent through the air gap to the HSL receiver 120, it initiates one or more heightened security level (HSL) actions to protect the backups stored in backup site 108. For example, the detection component 113 identifies a file being corrupted, and the information about the file is transmitted to the receiver 120 by way of HSL sender 112.

With respect to system 100, FIG. 1, an integrated flow diagram shows that the data journey starts from the production storage system 106 as it is backed up to a namespace in the backup system 108. The dataset (or subset of the backup environment) is then replicated over to a vault 104 under the sync step 1. The vault 104 is a second (e.g., long-term and highly secure) backup environment but is air gapped to the data center, as shown. In general, a cyber recovery vault 104, such as the DellEMC PowerProtect Cyber Recovery vault provides a data storage site is an isolated storage medium that provides multiple layers of protection to provide resilience against cyberattacks even from an insider threat. It moves critical data away from the attack surface, physically isolating it within a protected part of the data center and requires separate security credentials and multi-factor authentication for access. Additional safeguards include an automated operational air gap to provide network isolation and eliminate management interfaces which could be compromised. PowerProtect recovery tools automate the synchronization of data between production systems and the vault creating immutable copies with locked retention policies. If a cyberattack occurs users can quickly identify a clean copy of data and recover critical systems to resume normal operations.

Once the data lands in the vault namespace, the Point-In-Time (PIT) copy of the namespace is copied over (in copy step 2) to another namespace, and retention locked (lock step 3) by lock mechanism 118. At this stage, the infrastructure guarantees immutability of the data stream.

This locked copy of the data is then run through an analysis process of the detection component 113 (analyze step 4), which scans the data for malware, such as ransomware, etc. If any such malware is detected, the HSL sender closes the air gap (close step 5) and sends an alert signal (step 6) to the HSL receiver 120, which then initiates HSL actions to protect the backup datasets in 108 from any damage or future damage by the malware. It also finds and sends information on a last known good copy from the backup site through the air gap to the protection storage. If the identified copy is available in backup storage 108 then the HSL receiver 120 will protect that copy and the production site 106 can restore it from backup 108. This generally saves time and resources over a system recovery from protection storage 114 (step 9). For example, if a current backup copy (Version_B_backup) in protection storage 114 is analyzed and found to have malware, the HSL receiver 120 will be alerted and then initiate HSL actions to protect the other backup copies, and locate the last known good copy (e.g., Version_A_backup).

A monitoring and reporting component 116 (external or internal) monitors the analysis process, and if any malware is detected, it is reported to the user and/or system administrator, step 8, after which a recovery step 9 can be undertaken to restore the production environment 106. In general, the recovery process can be performed according to any rules or rulebooks set by the admin, user, or system per defined backup and recovery policies.

The system of FIG. 1 effectively limits the impact of any malware to setup files, etc. and no other data within the protection storage 114. It allows the system to be secure from attack vectors where the backups 108 are destroyed, as the vault 104 is inaccessible due to the air-gap 103. Given the analysis process 113, the user can detect when the corruption does occur. In an embodiment, the analyze process is a special program that uses a machine learning algorithm to scan the data for ransomware patterns. This algorithm is trained on known ransomware patterns for purposes of comparison to incoming access requests to predict and detect when any particular incoming request may be a malware operation.

As mentioned above, present methods of performing data recovery from a cyber recovery vault is often complex and time consuming. In case of a cyber-attack, the business is essentially down, so the efficiency of recovery is of paramount importance in ensuring smooth data continuity and business operations. Embodiments of the HSL sender 112 and HSL receiver 120 system improve on these present systems by implementing recovery from the production protection storage or DR protection storage to make recovery much easier, and quicker.

Figure 2A:
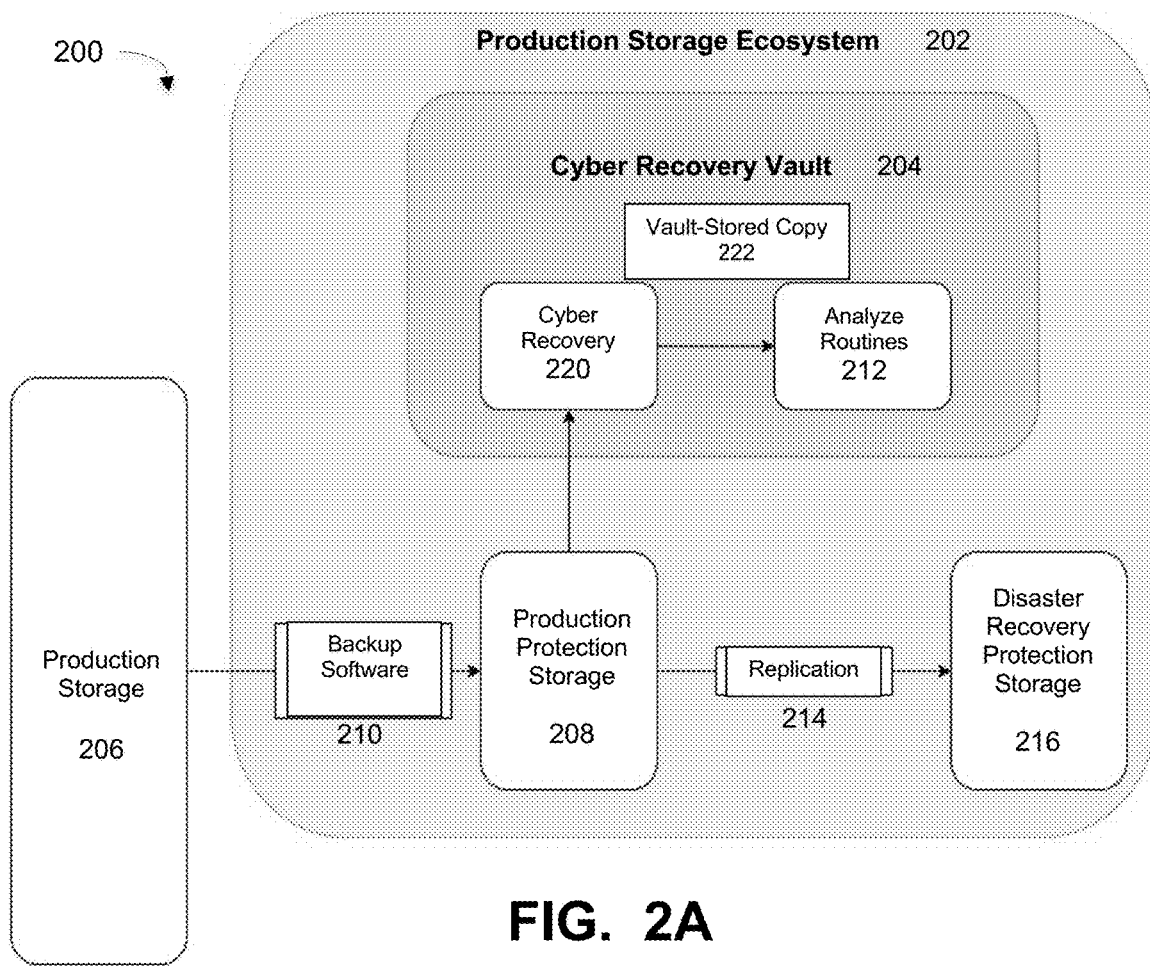
FIG. 2A illustrates a protection storage ecosystem that implements a cyber recovery solution, under some embodiments.

FIG. 2A illustrates a protection storage ecosystem that implements a cyber recovery solution, under some embodiments. As shown in FIG. 2A, system 200 includes production storage 206, which may be located in a data center or 'production site' 102, coupled to a protection storage ecosystem 202. This ecosystem includes backup software 210 executed by a backup server that backs up data to the production protection storage 208 and to the DR protection storage 216. In an embodiment, the production and DR protection storage may be implemented in two different storage sites, arrays, or locations, or they may be implemented as a single unitary protection/DR storage site. Embodiments will be described with respect to the distributed location of the production protection storage 208 and DR protection storage 216, but embodiments are not so limited. In system 200, the protection storage ecosystem 202 also includes a cyber recovery vault 204, which includes an analysis process 212 running analysis routines, and a cyber recovery solution process 220.

Figure 3:
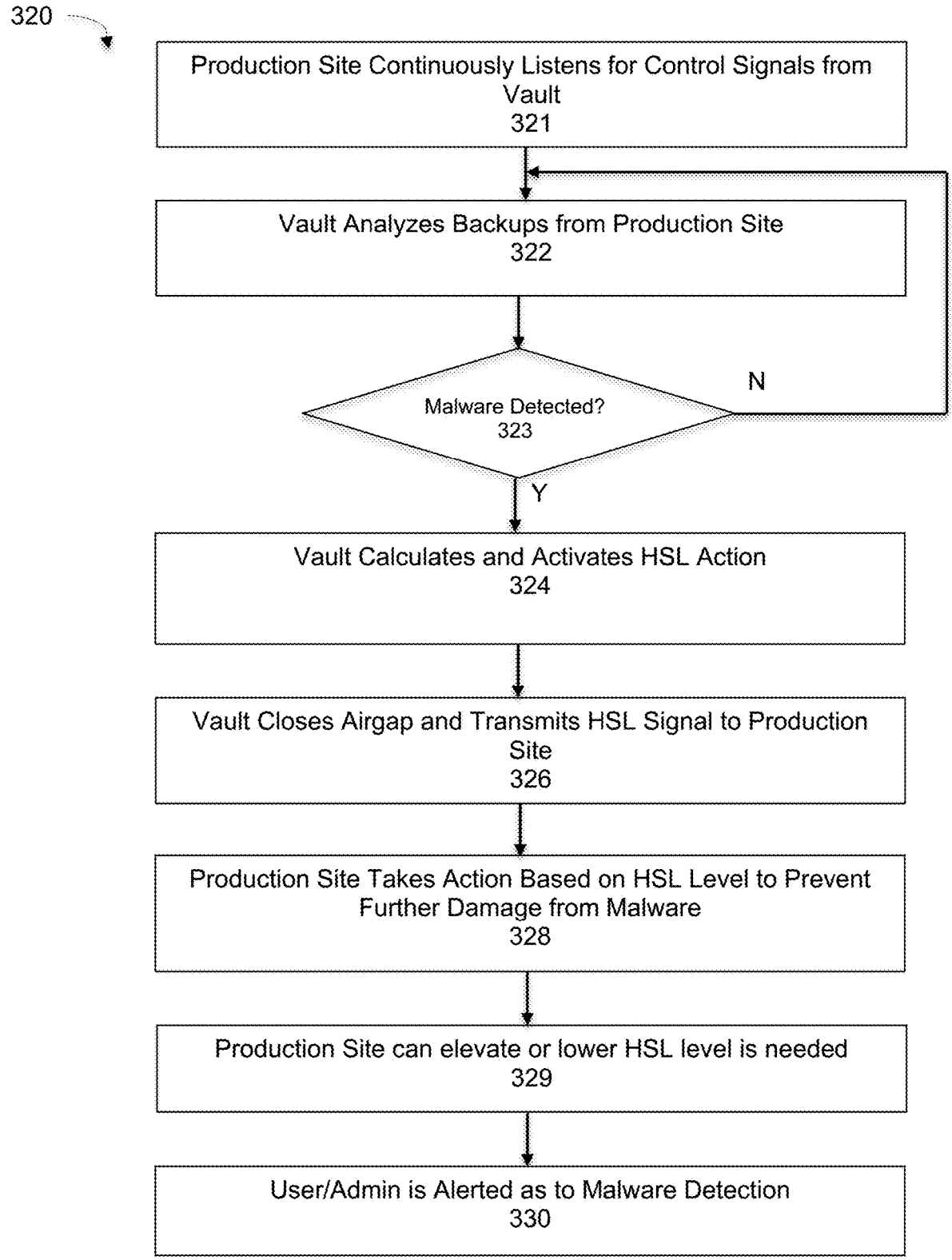
FIG. 3 is a flowchart that illustrates an overall process of performing a cyber recovery of a detected malware attack, under some embodiments.

FIG. 3 is a flowchart that illustrates an overall process of performing a cyber recovery of a detected malware attack, under some embodiments. Such a process may be performed by the cyber recovery solution component 220.

Figure 2B:
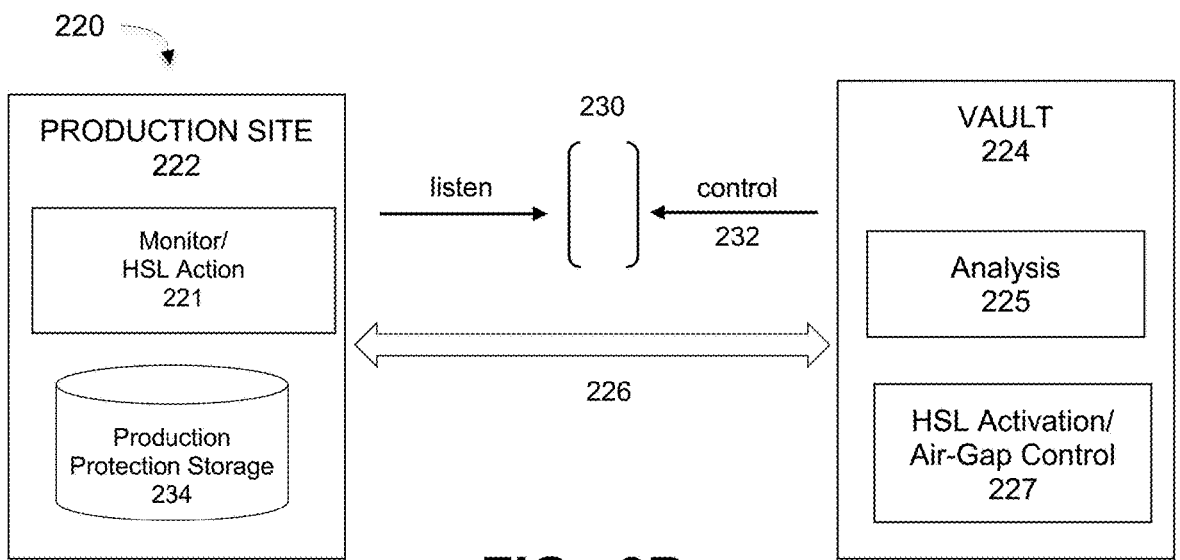
FIG. 2B illustrates a direct vault to data center interface through an automated air gap, under some embodiments.

FIG. 2B illustrates a direct vault to data center interface through an automated air gap, under some embodiments. System 220 is a generalization of a control and communication interface from the vault 224 through air gap 230 to the production site 222, and represents a customer/system configurable framework for heightened security detection and activation. In an embodiment a malware or security breach event is detected from the vault through analysis component 225. Such a detection is used to trigger an alert or control message that may be generated by an internal security process, an external alert, certain exception handling routines, or similar mechanisms, and is used to prevent/minimize the effect of any attempted destructive acts like filesystem or Mtree destroy or modify operations.

In an embodiment, the vault-based detection and alert mechanism 112, 113 of system 100 is used to protect copies data that are production protection storage 108 from damage or destruction in the event of any detected malware. In the event any such malware has affected the stored data, the vault mechanism prevent further destruction through initiating certain HSL actions. While it is quite possible that all copies are already destroyed before the vault can activate an HSL alert, in which case recovery must happen through existing procedures from the vault, early detection and alerts can greatly minimize further damage to the backed up data.

As shown in FIG. 2B, vault 224 also includes an HSL activation and air-gap control component 227 that, upon detecting malware, closes air gap 230 and determines and sends an appropriate HSL signal to the production site 222 as a control signal 232. The production site 222 contains an monitor component 221 that constantly listens for this control signal. Upon receiving such a signal, the production site monitors its internal situation and initiates certain HSL actions to protect or at least prevent further damage to data in the production protection storage (PPS) 234.

FIG. 3 is a flowchart illustrating a method of restoring data in a production site using a direct vault interface 226 of FIG. 2B and without requiring full backup restoration operations, under some embodiments. The overall process 320 leverages the intelligence provided by the analysis routines 225 executed in the vault 224 to activate higher levels of security and monitor what is happening in the production site 220 based on the level of heightened security that was activated.

As shown in FIG. 3, the production site continuously listens for control signals from the vault, 321, such as through monitor component 221. The vault learns and analyzes the backed up data, step 322, and calculates any need to activate heightened security measures at a certain level, such as upon detection of malware in the backup data. Thus, if malware is detected, step 323, the vault calculates and activates an appropriate heightened security level to be performed by the production site, step 324. The vault closes the air gap and transmits a control signal to the production site. The production site then begins to act and takes basic actions based on the customer configuration and the heightened security level indicated by the vault, step 328. It also begins to actively monitor the state of the data within the production site, e.g., PPS 234. While monitoring, the production site can elevate or decrease the HSL level based on its monitoring or based on another HSL signal coming from the vault, step 329. The production site self-monitoring process can determine if data within the production site is more or less vulnerable to attack by the malware detected by the vault. It can then determine if the HSL level calculated by the vault is insufficient, sufficient, or overly resource intensive to further protect the data.

The process can also be configured to send an alert to the user in parallel upon detection of malware by the vault, step 330.

The mechanism of FIG. 3 secures the data that exists on the production site, and greatly improves previous system in which the vault was only a passive system that received data through an air gap. In process 320, the vault, as a source system, analyzes backup data and decides when to open the air-gap to transmit HSL control message to the production site. The production site, as a receiver, includes components that receive HSL alerts from the vault, and take immediate actions based on an initial or generic level conveyed by the vault, and also begin to actively monitor activities on the production site itself.

As shown in FIG. 3, the vault-initiated malware protection process activates the production site to protect data from destruction. Thus, if a cyber or malware attack is detected, the main components of system 200, namely the production protection storage 208, DR protection storage 216, and potentially the backup software 210 and production storage 206 harden themselves to avoid destruction. This security hardening process essentially represents a 'clamping down' of the system against attacks. For this embodiment, the production and the DR protection storage systems go into an enhanced security mode, when any attack is detected. The enhanced security mode represents a shift in security level among different defined levels of heightened security.

Figure 2C:
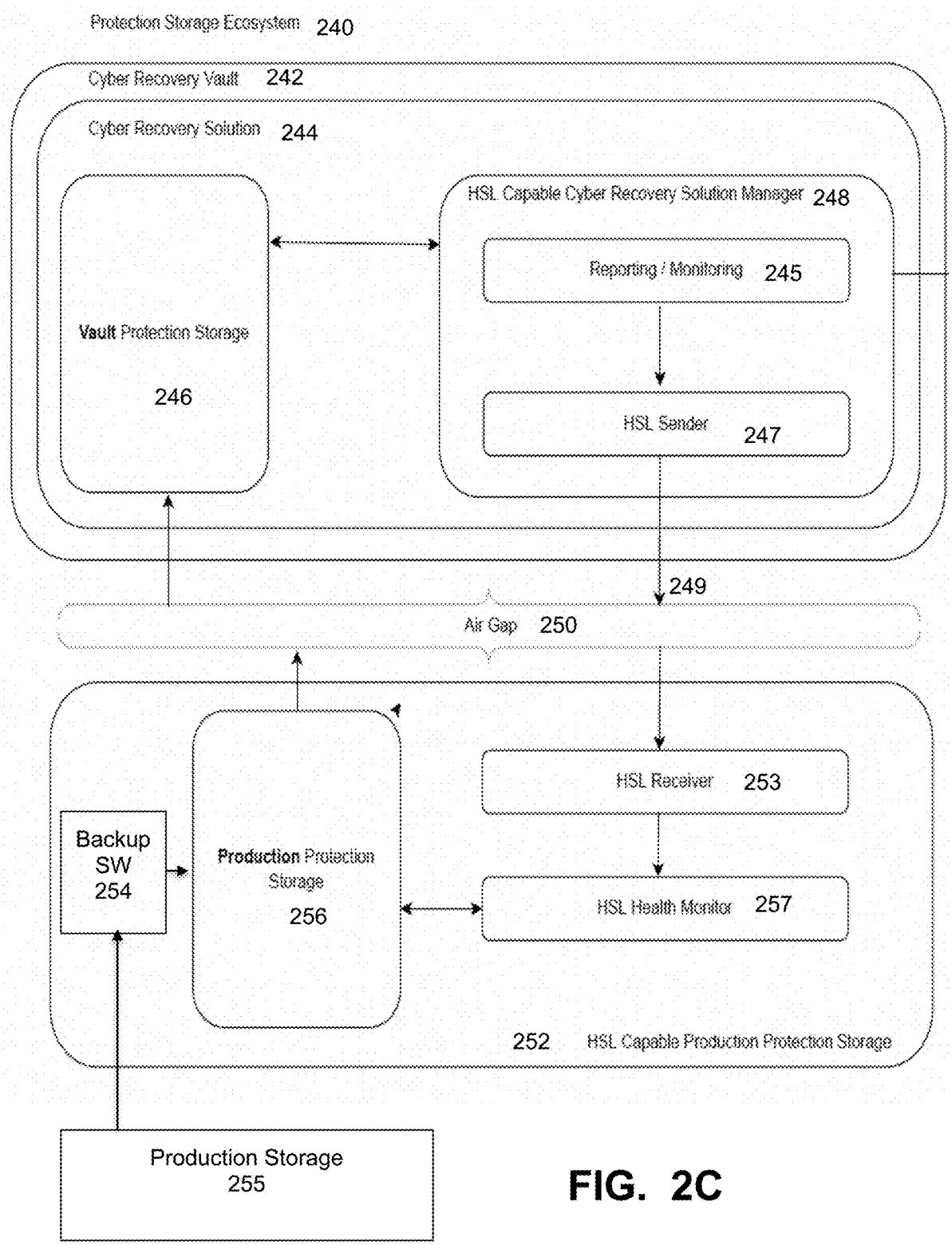
FIG. 2C illustrates a generalized protection storage ecosystem implementing a vault-based analysis and reporting system, under some embodiments.

FIG. 2C illustrates a protection storage ecosystem implementing a vault-based analysis and reporting system, under some embodiments. As shown in FIG. 2C, the protection storage ecosystem 240 includes production storage 255 whose data is backed up through backup software 254 to production protection storage (PPS) 256 within an HSL-capable PPS system 252. The cyber recovery vault 242 has a cyber recovery solution subsystem 244 including vault protection storage (VPS) 246, that is extremely well protected and uses data retention locking, so that the point-in-time copies are kept safe.

The air gap 250 is controlled exclusively by the cyber recovery vault 242, and the PPS 256 is configured to replicate data over to the VPS 246, but only when the air gap is closed. While the air gap is open, the PPS 256 simply waits for an appropriate signal from the vault.

Besides the vault protection storage 246 to store (vault) the backup data, the cyber recovery vault 242 includes a solution manager 248 that includes an analysis function that includes reporter/monitor 245 that performs monitoring and reporting tasks, and an HSL sender 247. The monitoring component 245 gets information about the good/bad data from the external scanning component. Determination of such bad data can be accomplished through any appropriate means, such as comparison of file hash values, top-level metadata checksums, and so on.

For the embodiment of FIG. 2C, the HSL sender 247 resides in the vault and analyzes the reports coming from the reporting engine 245 and if required, it activates an HSL alert 249. This is sent to an HSL receiver 253 that resides next to or within the PPS 256 in the HSL capable PPS system 252. The HSL receiver is configured to always listen to the sender 247. When it receives an alert signal 249, it communicates with an HSL health monitor component 257. This component has the capability to monitor operations that are happening on the PPS system 252, and basically sits idle unless an HSL alert (and corresponding HSL level) is communicated by the HSL receiver 253.

For the HSL-based protection storage system 240, the HSL sender 247 in the vault system 242 cannot communicate with the receiver 253 in the PPS system 252 unless the air gap 250 is closed, and this air gap is controlled only by the vault. The air gap is enhanced to allow the vault to communicate control messages 249 to the PPS system 252, so that a current HSL status is communicated to the receiver. Depending on system configuration, the air gap can be configured to close for time durations on the order of 1 millisecond, or similar, so that sending a command, such as "activate HSL-X" will immediately cause an action, since the receiver is always up and listening, and simply conveys the message to the health monitor 257 if anything is ever received.

The health monitor 257 is usually in an IDLE state and only starts to act when it receives an appropriate message (e.g., "activate HSL-X" kind of message) from the receiver 253. It starts to take actions (some were defined as part of HSL-0 to HSL-3 definitions). The health monitor 257 is configured to actively monitor the PPS 256 for any other condition that may cause it to bump a current HSL level to a higher level.

As stated above, the primary purpose of the HSL sender 247, receiver 253, and health monitor 257 is to protect copies that are sitting on the PPS 256 from destruction if any malware is present. Some destruction may occur, however, these components help avoid further data destruction to the extent possible.

Figure 2D:
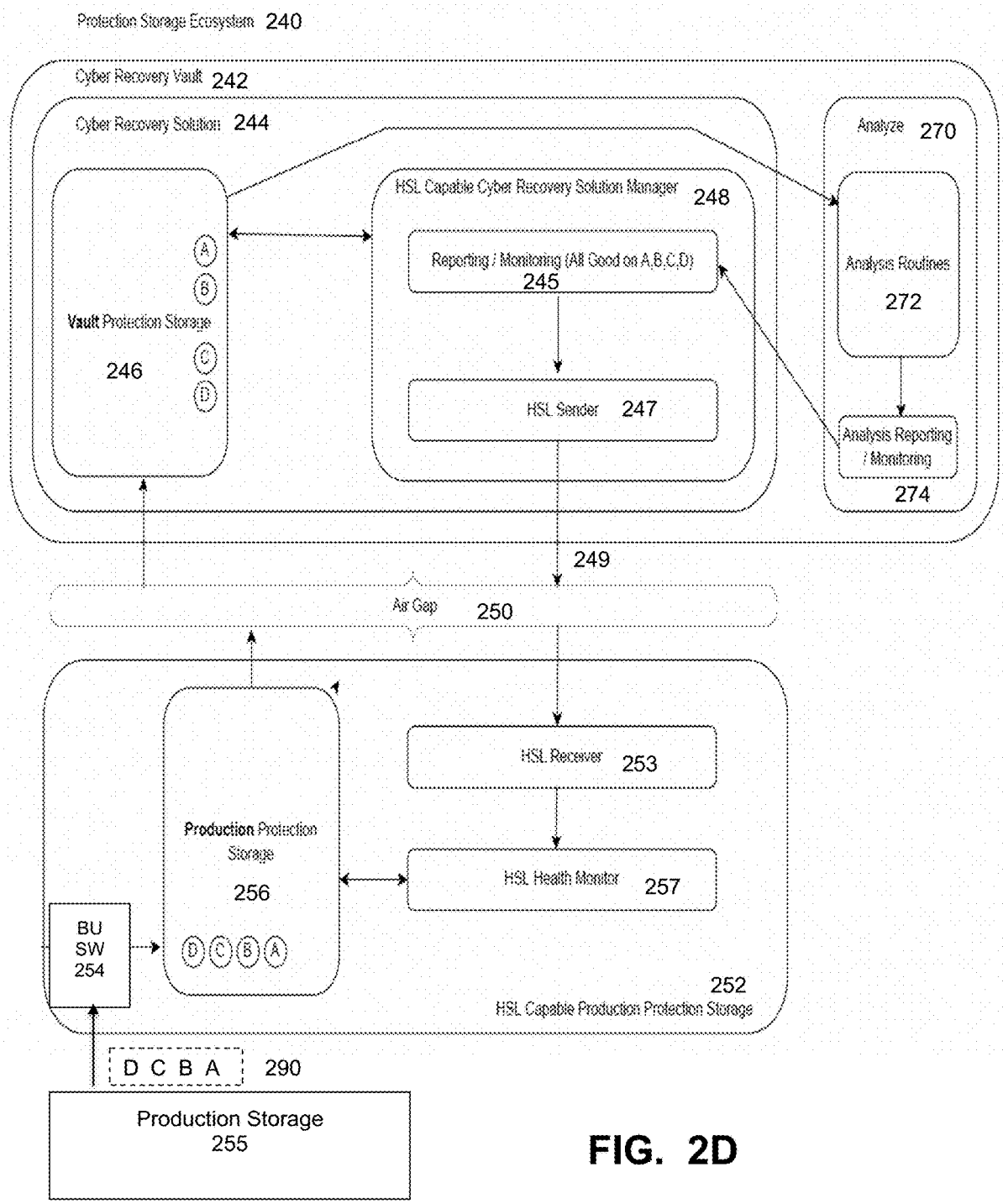
FIG. 2D illustrates a protection storage ecosystem having analysis functions and acting on a set of example good backup data, under some embodiments.

FIG. 2D illustrates a protection storage ecosystem 240 having analysis functions and acting on a set of example backup data, under some embodiments. For this diagram, there are a set of backups denoted "A, B, C and D" 290 that come in from backup software 254 to the PPS 256, and then flow to the VPS 246. In an embodiment, the cyber recovery vault 242 includes an analysis component 270 that implements analysis routines 272 that scan the backup data and deem them clean or corrupted/damaged by malware. The result is sent by an analysis reporting component 274 for transmission to the reporting component 245 in the solution manager 248 of the cyber recovery vault 242. FIG. 2D illustrates an example in which the backup data is deemed 'good' by the analyzer 270 so that the reporting component 245 reports a message such as "all good on A, B, C, D" or similar information.

Figures 4A, 4B:
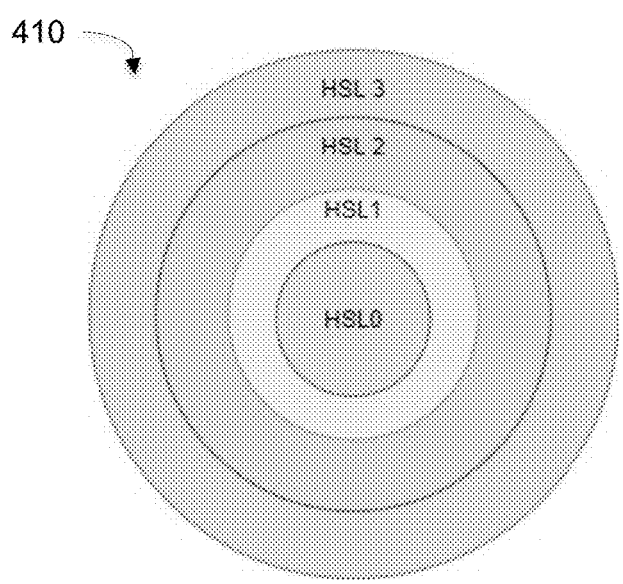
FIG. 4A is a table that shows different heightened security (HS) levels for a malware protection process, under some embodiments.
FIG. 4B is a graphical illustration of a hierarchy of the multiple HS levels of FIG. 4A, under some embodiments.

In an embodiment, various different HSL actions can be performed to protect the data in the production site (data center) upon a malware event trigger from the vault. FIG. 4A is a table that shows different heightened security (HS) levels for a malware protection process, under some embodiments. As shown in Table 400, there are four different heightened security levels denoted HSL0, HSL1, HSL2, and HSL3. Each of these different levels imposes different restrictions on operations and operating parameters of the storage devices in system 200.

As shown in FIG. 4A, there is a hierarchy among the HSL levels from most secure to least secure, and the protection process could move among the security levels during operation. FIG. 4B is a graphical illustration of a hierarchy of the multiple HS levels of FIG. 4A, under some embodiments. For FIG. 4B, this relationship among the HSL levels is as concentric rings of security levels, 410. In diagram 410, the strongest security level, HSL0 resides in the center of the ring 410 followed by HSL1, HSL2, and then HSL3 as the outermost ring. During operation, the system would fall outwards to lower security rings, with time, or determined steps.

For example, if the system is in HSL1, it would fall out to HSL2 once the requirements of HSL 2 are met. The system starts at a given security level depending on the confidence with which the alert is issued. For example, if the true ransomware is detected in multiple files, then it is more than likely that the user is a victim of a malware attack. In this case, the user would want to enter HSL 0. If there is less confidence behind the issuance of the alert, the system could start at HSL1, HSL2, or even HSL3, if appropriate, such as in cases where there may be false positives giving rise to low confidence alerts. It should be noted that these rules governing starting at and moving among HSL levels are governed by the users' requirements, and guidelines depending on criticality of the data and the magnitude of the attack.

In an embodiment, the HSL level that is enacted, as well as certain action options within each level are determined based on the type of attack, attack operations, targeted assets, and the confidence or likelihood of attack, among other similar factors.

Figures 4C, 5:
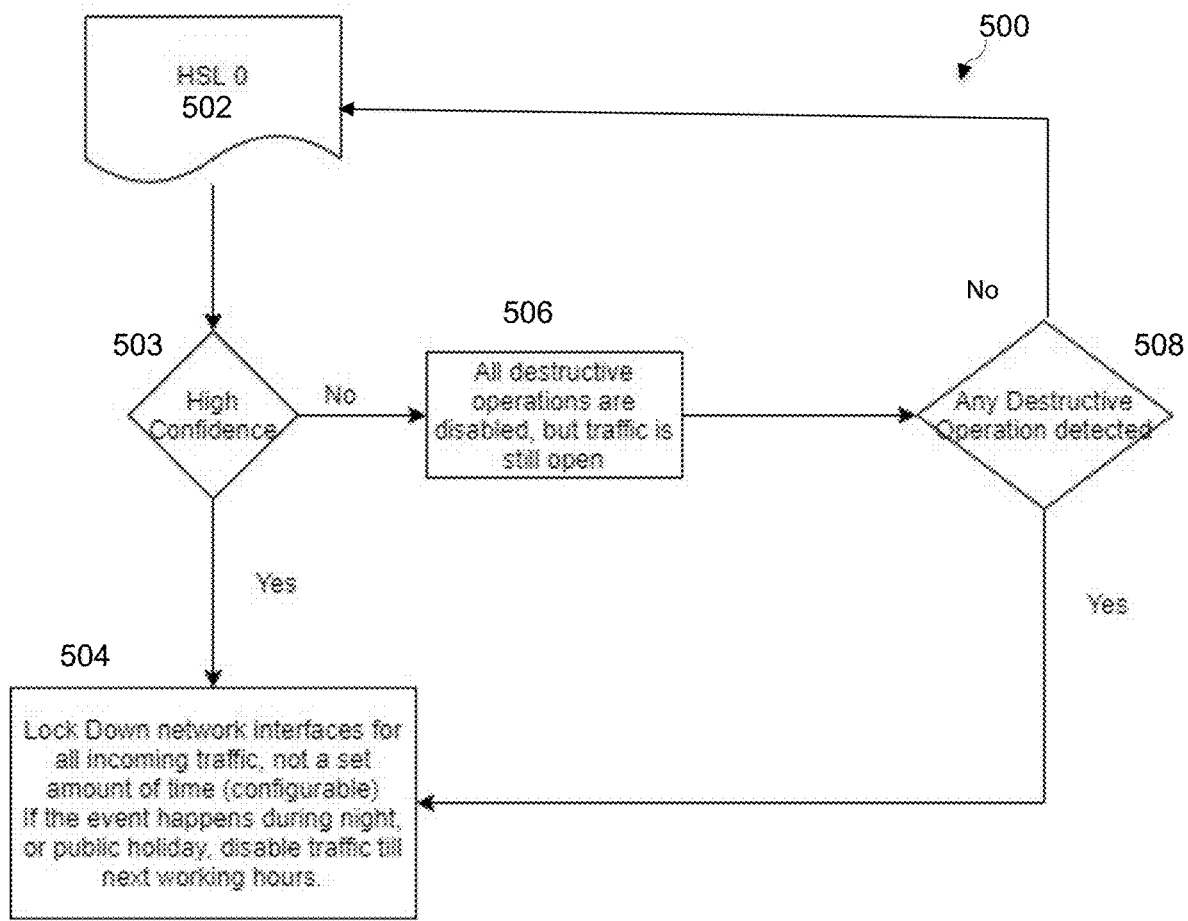
FIG. 4C illustrates the correlation between alert confidence and attack danger relative to the appropriate HSL level, under some embodiments.
FIG. 5 is a flow diagram that illustrates operation of the highest heightened security level (HSL0), under some embodiments.

FIG. 4C illustrates the correlation between alert confidence and attack danger relative to the appropriate HSL level, under some embodiments. As shown in Table 420, HSL0 is triggered by high confidence alerts of dangerous attacks, HSL1 is triggered by high confidence alerts of possible attacks, HSL2 is triggered by low confidence alerts of a possible attack, and HSL3 is triggered by a suspicion of a possible attack or dangerous operation.

The highest security level is Heightened Security Level 0 (HSL 0), which is the strongest protective measure against an attack or potential attack, and constitutes an almost total lockdown mode. The actions performed for this heightened security level include locking down the production protection storage 208 and DR protection storage 216 to all external traffic. The intent here is to protect the systems and the backups which are on the system. The lockdown is configurable and would last for a set time period, such as for at-least 12 hours or 24 hours, etc. Other time dependent actions can also be imposed, such as if an attack alert was issued during non-working hours (e.g., nights, weekends, holidays, etc.), the network traffic would be re-enabled on the next working day, and so on. In some cases, this might mean that new backups will fail, however this measure may be needed to fully protect the system from bad actors.

The HSL0 level response level would certainly be entered in the case of a high confidence alert issued for a known destructive malware detection. However, even if this alert was issued with low confidence destructive operations, such as commands to delete namespaces or filesystems, these commands will be blocked and not executed, and would trigger the system entering the complete lockdown mode of HSL0.

FIG. 5 is a flow diagram that illustrates operation of the highest heightened security level (HSL0), under some embodiments. As shown in FIG. 5, process 500 starts with the HSL0 flag 502. In step 503 it is determined the level of confidence with the alert. In an embodiment the alert is classified as either high confidence or low high confidence (i.e., not high confidence). Other classification metrics can also be used. If the alert confidence is high, the security process 220 then initiates a total lockdown with all traffic disabled, as described above, 504. If, however, the alert confidence is low, the security process may only disable destructive operations (delete, trash, move, etc.), but still allow data traffic to the system, 506. For this continued traffic, the detection and reporting function 113 and 120 continues to monitor the allowed traffic to detect any destructive operation, 508, which would trigger a high confidence alert, and in this case would cause the system to initiate a full lockdown procedure, 504.

The next highest security level is Heightened Security Level 1 (HSL1). In this mode, traffic to the system is allowed, and the security mechanisms are to fail all delete operations if confidence in this mode is high, or fail only deletes of files aged over a certain time or within a certain time range if confidence in this mode is low. In addition, the garbage collection process be disabled for a certain period of time (e.g., a few days).

Figure 6:
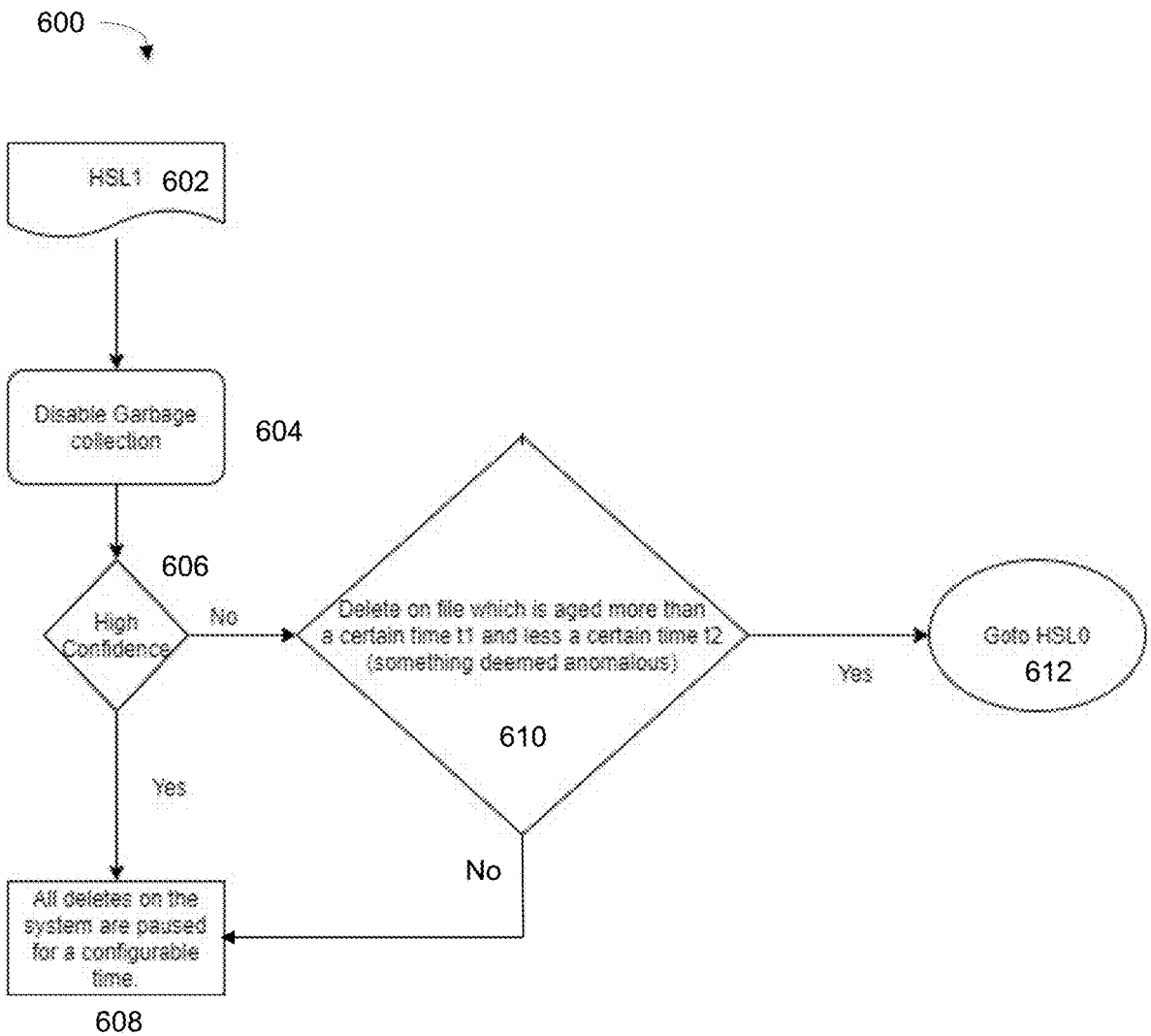
FIG. 6 is a flow diagram that illustrates operation of the second highest heightened security level (HSL1), under some embodiments.

FIG. 6 is a flow diagram that illustrates operation of the second highest heightened security level (HSL1), under some embodiments. As shown in FIG. 6, process 600 starts with the HSL1 flag 602. For this level, garbage collection is disabled as a matter of course, 604. In step 606 it is determined the level of confidence with the alert. If the alert confidence is high, the security process then initiates a temporary lockdown with all traffic disabled for a set and configurable amount of time, 608. In this step, all deletes in the system are paused to disable expiry of all backups. If, however, the alert confidence is low, the security process only disables destructive operations (delete, trash, move, etc.), for files over a certain age or within a certain period, but still allows data traffic to the system, 610. That is, it disables deletes on recent files and monitors deletes.

Furthermore, under this HSL1 mode, another measure to achieve immutability is to take, for the given namespace, a snapshot of the data. This would be a "hidden" snapshot which is not visible to the namespace and cannot be deleted by any administrator. The expiry associated with this type of snapshot is defined in advance and can only be extended and not shortened. Once the snapshot is taken, the filesystem can allow the deletes on the objects that are covered by the snapshot copy. Recovery from such a snapshot can be a support-based operation. Such a mechanism can be used in either or both of HSL1 or HSL2.

Figure 7:
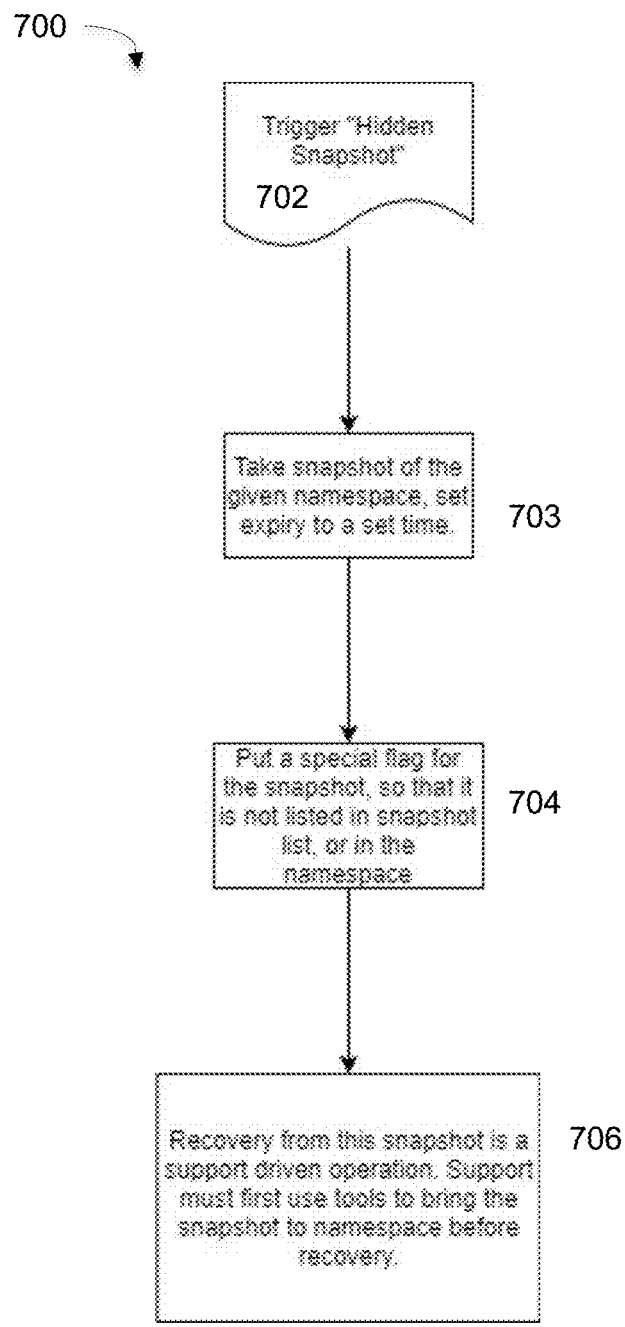
FIG. 7 is a flowchart that illustrates the hidden snapshot process for the HSL1 mode, under some embodiments.

FIG. 7 is a flowchart that illustrates the hidden snapshot process for the HSL1 mode, under some embodiments. Process 700 starts with triggering the hidden snapshot function, 702. The backup software takes a snapshot of the given namespace, and sets the expiry time to a specified day/time, or time period from the snapshot copy, 703. The process puts a special flag on the snapshot so that it is not listed on a snapshot list or in the namespace, thus keeping it 'hidden,' 704. To recover this snapshot, a support driven operation is initiated, which uses tools to bring the snapshot to the namespace before recovery and restoration using the snapshot copy, 706.

The third highest security level is Heightened Security Level 2 (HSL2). In this mode, the analysis process 212 determines the list of clean copies, and their corresponding paths on the production protection storage, 208. In this mode, the clean copies are identified and protected using retention locks. This is a special kind of "system driven" retention lock which is not bound by licenses. This kind of protection will be initiated even if retention lock feature is not enabled, thus providing a highly focused level of security.

Retention locking is a functionality that is used on many backup systems, such as Data Domain Restorers (DDRs) to prevent modification or deletion of certain sets of files for a predetermined period, referred to as the 'lock period.' Retention locked files are set as read-only files until their retention expires, at which point they are set to read/write to allow modification and/or deletion. For a file stored locally to a server, retention locking is relatively simple and involves protecting the file from filesystem operations like overwrites, appends, and deletions. The namespace can have numerous files with different retention lock durations, while sharing the same segments.

Figure 8:
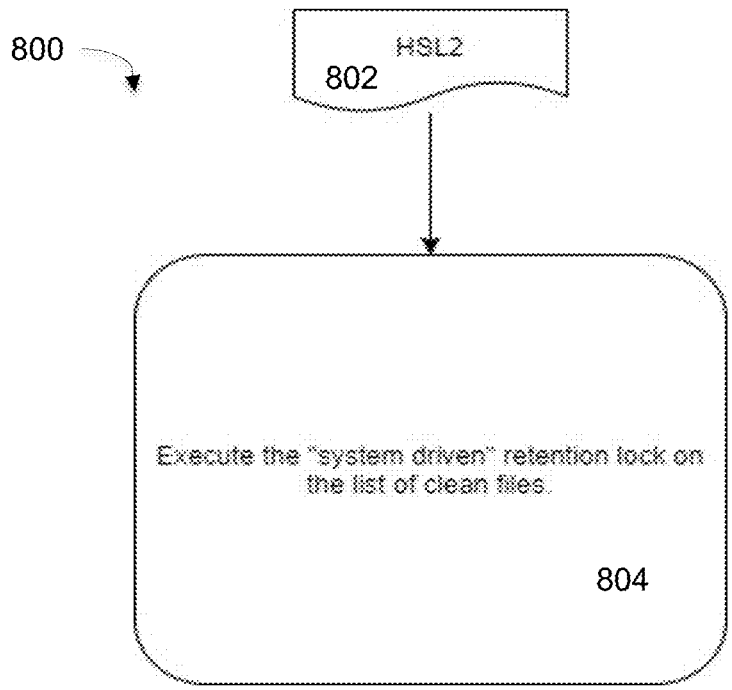
FIG. 8 is a flow diagram that illustrates operation of the third highest heightened security level (HSL2), under some embodiments.

FIG. 8 is a flow diagram that illustrates operation of the third highest heightened security level (HSL2), under some embodiments. As shown in FIG. 8, process 800 starts with the HSL2 flag 802. In step 804 the system executes a system driven retention lock on the list of clean files.

The fourth and least highest security level is Heightened Security Level 3 (HSL3). In this mode the backup software 210 and clients corresponding to the files are identified. These are then alerted of the possibility of a corruption, and it is left to the administrators to then take appropriate action. For this mode, in order to figure out the client corresponding to the files which are being backed up, the system stores the client information in the extended metadata for each file. In most cases the network or internet protocol (IP) information would be enough for this purpose. In some cases, such as where the backup software is a proxy, other identifiers may be used as identifiers. The IP addresses or the asset identifier can be used to block new traffic from these tainted assets. Furthermore, any I/O operations from these tainted interfaces must be alerted so that these resources may be quarantined, and the tainted files can be listed in a blacklist. Any clients that include data from the tainted files could be blocked, and alerts generated.

Figure 9:
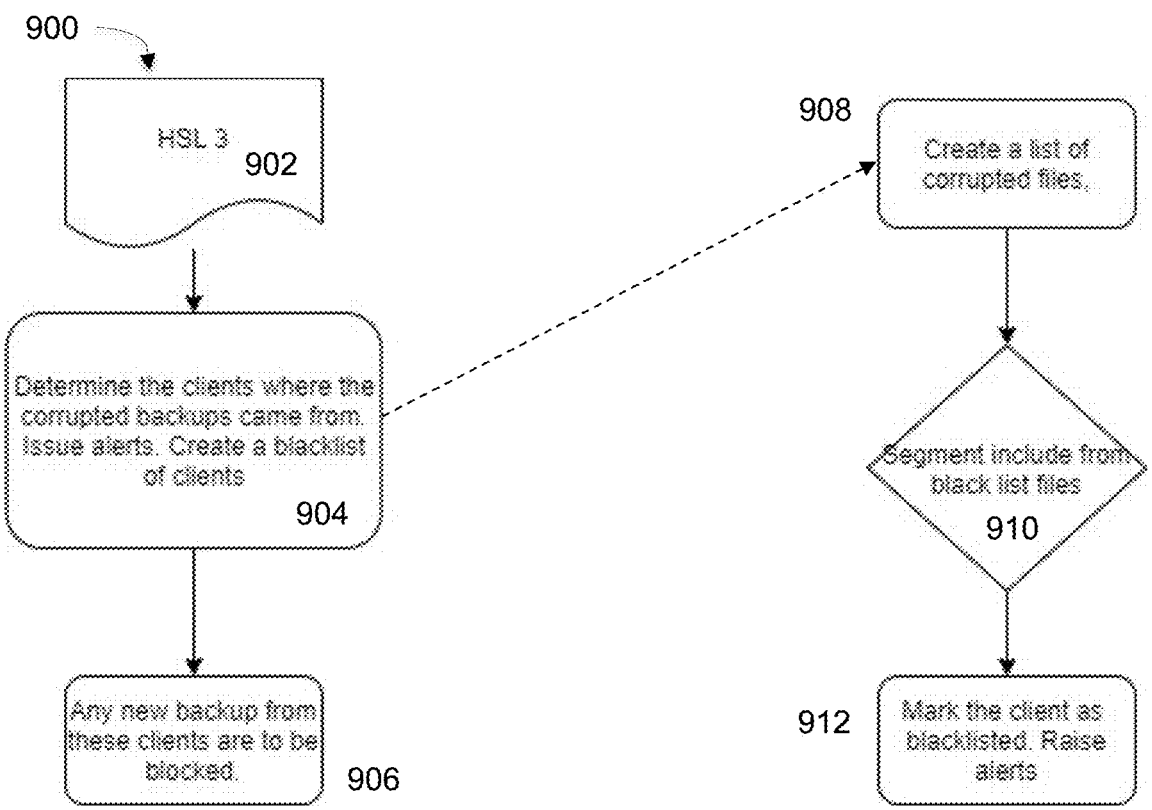
FIG. 9 is a flow diagram that illustrates operation of the fourth highest heightened security level (HSL3), under some embodiments.

FIG. 9 is a flow diagram that illustrates operation of the fourth highest heightened security level (HSL3), under some embodiments. As shown in FIG. 9, process 900 starts with the HSL3 flag 902. The process first determines the clients from which the corrupted backup files originated, and then issues alerts and puts these clients on a blacklist, 904. Any new backup from these blacklisted clients is then blocked, 906. For the blacklist, process 900 creates a list of corrupted files, 908. It then includes segments from the blacklist files, 910, and marks the clients as blacklisted, and the system then raises the appropriate alerts, 912. In general, process 900 gets a list of fingerprints that caused the malware detection component and maps these to files/clients and blocks the clients, only using the few fingerprints in the blacklist, as opposed to all the fingerprints from the files, which could be an exceedingly large list.

For the security modes that involve sending alert messages, such as HSL3, the system 200 includes a set of APIs or SNMP traps for the alerts which could be used to transmit the information about the possible corruption. These can then be used by third party products (e.g., backup software, production storage, applications, or their administrators) to take appropriate actions.

As shown in FIGS. 1 and 2, the cyber recovery vault 204 is within an air gap 103 so that even if the corruption is detected, this information must be transmitted to the production protection storage 208. In an embodiment, the air gap is operated from within the vault by the cyber recovery software. For the automated notification and control of the production protection storage, the air gap can be opened and closed as needed for transmission of control messages.

For this embodiment, the production protection storage 208 is configured to implicitly trust the cyber recovery vault 204. Therefore, the production protection storage must act as soon as it pushes the information of the cyber-attack. This also extends to when the production protection storage 208 notifies alerts to all the DR protection storage systems 216 connected to it (i.e., all the replicas). This process can be extended yet further to other listeners, such as the production storage 206, backup software 210, and applications.

Figure 10:
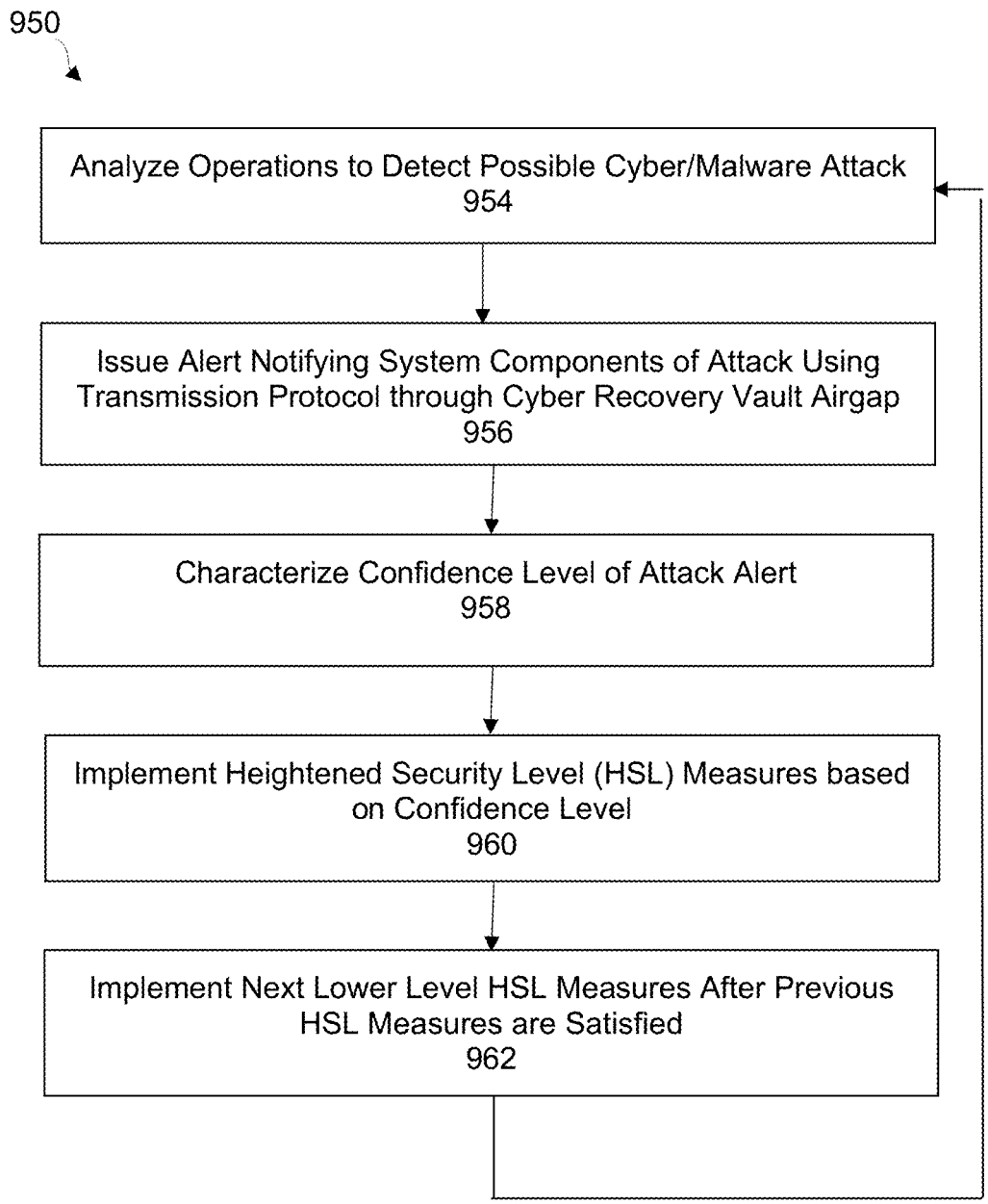
FIG. 10 is a flowchart illustrating a method of providing proactive protection against malware attacks using a cyber recovery vault, under some embodiments.

FIG. 10 is a flowchart illustrating a method of providing proactive protection against malware attacks using a cyber recovery vault, under some embodiments. In process 950 of FIG. 10, the system (e.g., detection component 113) analyzes operations on the production protection storage to detect possible cyber or malware attacks using defined analysis methods and tools, 954. When any possible attack is detected, the system issues an alert notifying system components of the attack or potential attack, 956. This can be performed using the communication protocols described above for transmitting through the cyber vault air gap, as described above.

The confidence level of the attack alert is then characterized, 958. In an embodiment, this characterization can be a simple binary value, such as high or low confidence, or it may be a value along a scale within a range, such as 1, 2, 3, etc., if multiple different response actions are available to be taken.

Based on the alert confidence level, the system implements an appropriate HSL level measure or set of measures to protect the system. These measures comprise blocking or suspending certain operations indefinitely or for fixed periods of time, sending alerts, conditionally allowing certain operations, and so on. Any practical number of HSL levels may be used, such as four levels (as described above), or any similar number. The HSL levels are defined hierarchically so they range from most restrictive measures for high confidence of dangerous attacks down to less restrictive measures for low confidence or not critically dangerous attacks.

Embodiments thus provide a method and system to improve data recovery and restoration times by clamping down security after ransomware detection, as well as method to communicate and control the production protection storage from the cyber recovery vault.

They further provide a method to take a hidden immutable snapshot of the filesystem/namespace on the event of a ransomware trigger, and to retention lock a set of files, even without the appropriate licenses/feature enablement. The method determines a blacklist of the files determined to be corrupted to a protection storage filesystem and propagating the information to the protection storage systems (production protection storage, and the DR protection storage), as well as a whitelist and blacklist of the clients writing to a protection storage filesystem. The method blocks requests to reduce the corruption associated with a blacklist of files, or the clients accessing the files.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 11:
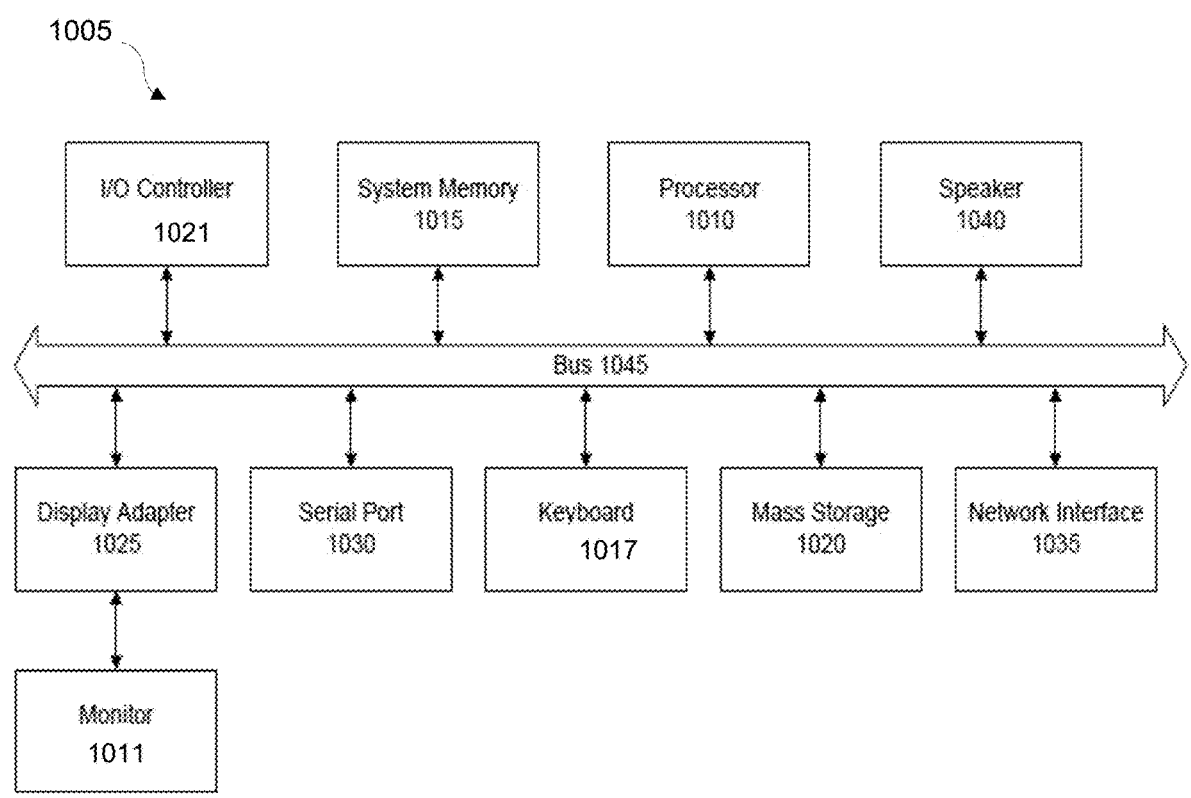
FIG. 11 is a system block diagram of a computer system used to execute one or more software components of methods and systems described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network (or steps) using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method, implemented using at least one hardware processor, of preventing malware attacks in a data protection system, comprising:
    providing an air gap between a data center and a vault, the data center having a production site generating and storing datasets to be backed up, and the vault having protection storage for isolated storage of a backup dataset; analyzing, in an analyzer component of the vault, the backup dataset to detect bad data; closing, upon detection of bad data, the air gap by the vault;
    issuing an alert signal from the vault to the data center to implement heightened security measures; implementing, in the data center, heightened security measures to protect data in the production site from further damage or destruction; and wherein the heightened security measures are organized into a series of hierarchical security levels (HSL) as classified into a classification ranging from a highest level of security imposing most stringent I/O restrictions to a lowest level of security imposing least stringent I/O restrictions.

2. The method of claim 1 further comprising determining, in the vault, an initial HSL level for transmission to the data center in the alert signal.

3. The method of claim 2 wherein the data center monitors its own internal condition and maintains, elevates, or lowers the initial HSL level from the vault to a different HSL level based on one of: the monitoring, or a subsequent HLS level signal from the vault.

4. The method of claim 2 wherein the heightened security measures absolutely or conditionally suspend certain input/output (I/O) operations in the data center for an indefinite or temporary period of time.

5. The method of claim 4 further comprising:
    implementing a first HSL level of security measures based on the classification; and
    determining whether or not the first HSL level of security measures is satisfied, and if so, implementing a next lower HSL level of security measures in the hierarchy.

6. The method of claim 3 further comprising:
    providing an HSL sender component in the vault transmitting the alert signal;
    providing an HSL receiver component in the data center for receiving the transmitted alert signal; and
    providing a health monitor component coupled to the HSL receiver to monitor operations and the internal conditions in the data center.

7. The method of claim 6 wherein the HSL receiver and the health monitor component are always on and become active only upon receiving the control signal from the HSL sender.

8. The method of claim 1 further comprising transmitting a user alert signal to a user upon detection of malware by the vault.

* * * * *